US010938958B2

(12) United States Patent
Cronin

(10) Patent No.: US 10,938,958 B2
(45) Date of Patent: Mar. 2, 2021

(54) VIRTUAL REALITY UNIVERSE REPRESENTATION CHANGES VIEWING BASED UPON CLIENT SIDE PARAMETERS

(71) Applicant: SONY INTERACTIVE ENTERTAINMENT LLC, San Mateo, CA (US)

(72) Inventor: John Cronin, Williston, VT (US)

(73) Assignee: SONY INTERACTIVE ENTERTAINMENT LLC, San Mateo, CA (US)

( * ) Notice: Subject to any disclaimer, the term of this patent is extended or adjusted under 35 U.S.C. 154(b) by 20 days.

(21) Appl. No.: 16/438,344

(22) Filed: Jun. 11, 2019

(65) Prior Publication Data

US 2019/0297172 A1 Sep. 26, 2019

Related U.S. Application Data

(63) Continuation of application No. 15/832,022, filed on Dec. 5, 2017, now Pat. No. 10,320,946, which is a (Continued)

(51) Int. Cl.
*H04L 29/06* (2006.01)
*A63F 13/352* (2014.01)

(Continued)

(52) U.S. Cl.
CPC ............ *H04L 67/38* (2013.01); *A63F 13/352* (2014.09); *A63F 13/355* (2014.09); *A63F 13/63* (2014.09);

(Continued)

(58) Field of Classification Search
CPC ...... A63F 13/63; A63F 13/352; A63F 13/355; A63F 13/335; H04L 67/32; H04L 67/38; H04L 67/42

(Continued)

(56) References Cited

U.S. PATENT DOCUMENTS 3,883,237 A 5/1975 Juergens
5,258,785 A 11/1993 Dawkins, Jr.

(Continued)

FOREIGN PATENT DOCUMENTS

CN 101 098 491 A 1/2008
CN 106 471 420 B 4/2019

(Continued)

OTHER PUBLICATIONS

U.S. Appl. No. 14/460,272 Office Action dated Jun. 2, 2020.

(Continued)

*Primary Examiner* — Abdullahi E Salad
(74) *Attorney, Agent, or Firm* — Polsinelli LLP

(57) ABSTRACT

Systems and methods for enabling a visitor to access VR representations authored by different authors of images at different quality levels at various locations in a virtual universe via a computer network are provided. A plurality of data sets may be stored in memory. Each VR data set may define a VR representation of a location and may be independently authored by a respective author different from the other authors. In addition, each VR dataset may have a speed and quality metric to assist the visitors in an optimized experience. One or more VR data servers may access and transmit the VR data sets of various quality and speeds, each of which may be associated with a VR data server having access to the VR data set. A domain server may be adapted to access and transmit domain data comprising the location within the universe of each VR representation and the network address of the VR data server associated with the VR representation. Further, a client host may be adapted to communicate with the domain server to receive domain data representing the network address of the VR data server associated with a bets matched quality and speed VR representation and to communicate with that VR data server to (Continued)

access the VR data set defining the VR representation without leaving the virtual universe.

19 Claims, 8 Drawing Sheets

Related U.S. Application Data continuation of application No. 14/460,277, filed on Aug. 14, 2014, now Pat. No. 9,838,506, which is a continuation of application No. 14/147,433, filed on Jan. 3, 2014, now abandoned.

(60) Provisional application No. 61/786,576, filed on Mar. 15, 2013.

(51) Int. Cl.
*A63F 13/63* (2014.01)
*H04L 29/08* (2006.01)
*A63F 13/355* (2014.01)
*A63F 13/335* (2014.01)

(52) U.S. Cl.
CPC ............ *H04L 67/32* (2013.01); *A63F 13/335* (2014.09); *H04L 67/42* (2013.01)

(58) Field of Classification Search
USPC .................................................. 709/203–204
See application file for complete search history.

(56) References Cited

U.S. PATENT DOCUMENTS 5,585,871 A 12/1996 Linden
5,757,358 A 5/1998 Osga
5,982,555 A 11/1999 Melville et al.
6,084,979 A 7/2000 Kanade et al.
6,151,060 A 11/2000 Tabata
6,152,563 A 11/2000 Hutchinson et al.
6,175,352 B1 1/2001 Kay et al.
6,184,847 B1 2/2001 Fateh et al.
6,282,362 B1 8/2001 Murphy et al.
6,315,273 B1 11/2001 Davies
6,345,129 B1 2/2002 Aharon
6,415,316 B1 7/2002 Van Der Meer
7,298,378 B1 * 11/2007 Hagenbuch ........... G06F 16/444 345/589
7,667,700 B1 2/2010 Neely et al.
7,933,395 B1 4/2011 Bailly et al.
7,949,642 B2 5/2011 Yang et al.
7,970,240 B1 6/2011 Chao et al.
8,803,912 B1 8/2014 Fouts
9,007,301 B1 4/2015 Raffle et al.
9,043,325 B1 5/2015 Moczydlowski
9,096,920 B1 8/2015 Gomez et al.
9,213,185 B1 12/2015 Stamer et al.
9,240,014 B1 1/2016 Hoffman et al.
9,254,438 B2 * 2/2016 Finn ...................... A63F 13/525
9,256,347 B2 * 2/2016 Finn ........................ A63F 13/10
9,261,959 B1 2/2016 D'Amico et al.
9,318,026 B2 4/2016 Peters et al.
9,329,682 B2 5/2016 Keane et al.
9,437,159 B2 9/2016 Moravetz
9,472,014 B2 10/2016 Chan et al.
9,521,368 B1 12/2016 Cronin
9,555,334 B2 1/2017 Bernard et al.
9,588,343 B2 3/2017 Cronin
9,669,296 B1 6/2017 Hibbert et al.
9,710,873 B1 7/2017 Hill
9,818,230 B2 11/2017 Moravetz
9,838,506 B1 12/2017 Cronin
9,986,207 B2 5/2018 Cronin
10,096,167 B2 10/2018 Moravetz
10,216,738 B1 2/2019 Cronin
10,320,946 B2 6/2019 Cronin
10,356,215 B1 7/2019 Cronin
10,401,958 B2 9/2019 Peana et al.
10,474,711 B1 11/2019 Cronin
10,565,249 B1 2/2020 Cronin
10,599,707 B1 3/2020 Cronin
10,809,798 B2 10/2020 Moravetz
2002/0038456 A1 3/2002 Hansen et al.
2002/0083134 A1 6/2002 Bauer et al.
2004/0111332 A1 6/2004 Baar et al.
2004/0193441 A1 9/2004 Altieri
2005/0086612 A1 4/2005 Gettman et al.
2006/0026170 A1 2/2006 Kreitler et al.
2006/0028400 A1 2/2006 Lapstun et al.
2006/0236240 A1 10/2006 Lebow
2006/0242680 A1 10/2006 Johnson et al.
2007/0296646 A1 12/2007 Yamamoto et al.
2008/0024392 A1 1/2008 Gustafsson et al.
2008/0106489 A1 5/2008 Brown et al.
2008/0155019 A1 6/2008 Wallace et al.
2008/0221843 A1 9/2008 Shenkar et al.
2008/0306817 A1 12/2008 Amidon et al.
2009/0005961 A1 1/2009 Grabowski et al.
2009/0106672 A1 4/2009 Burstrom
2009/0112469 A1 4/2009 Lapidot et al.
2009/0113349 A1 4/2009 Zohar et al.
2009/0263777 A1 10/2009 Kohn
2009/0271436 A1 10/2009 Reisinger
2010/0017728 A1 1/2010 Cho et al.
2010/0026718 A1 2/2010 Jetha et al.
2010/0083169 A1 4/2010 Athsani et al.
2010/0088632 A1 4/2010 Knowles et al.
2010/0102476 A1 4/2010 Higgins
2010/0110069 A1 5/2010 Yuan
2010/0208029 A1 8/2010 Marti et al.
2010/0231706 A1 9/2010 Maguire
2010/0238161 A1 9/2010 Varga et al.
2010/0259471 A1 10/2010 Takano et al.
2010/0262933 A1 10/2010 Kim et al.
2011/0043530 A1 2/2011 Nozuki
2011/0055727 A1 3/2011 Dawson et al.
2011/0087350 A1 4/2011 Fogel et al.
2011/0214071 A1 9/2011 Zyda et al.
2011/0219291 A1 9/2011 Lisa
2011/0267419 A1 11/2011 Quinn et al.
2011/0301760 A1 12/2011 Shuster et al.
2011/0313779 A1 12/2011 Herzog et al.
2012/0050257 A1 3/2012 Clarke
2012/0059941 A1 3/2012 Cabasse et al.
2012/0086727 A1 4/2012 Korah et al.
2012/0113092 A1 5/2012 Bar-zeev et al.
2012/0120498 A1 5/2012 Harrison et al.
2012/0127062 A1 5/2012 Bar-zeev et al.
2012/0154277 A1 6/2012 Bar-zeev et al.
2012/0154557 A1 6/2012 Perez et al.
2012/0188148 A1 7/2012 DeJong
2012/0194418 A1 8/2012 Osterhout et al.
2012/0194552 A1 8/2012 Osterhout et al.
2012/0249480 A1 10/2012 Keenan et al.
2012/0249741 A1 10/2012 Maciocci et al.
2012/0289147 A1 * 11/2012 Raleigh .............. H04N 21/6547 455/3.06
2012/0311043 A1 * 12/2012 Chen ................ H04N 21/23406 709/204
2013/0007668 A1 1/2013 Liu et al.
2013/0021373 A1 1/2013 Vaught et al.
2013/0057550 A1 3/2013 Kishikawa et al.
2013/0069787 A1 3/2013 Petrou
2013/0083009 A1 4/2013 Geisner et al.
2013/0083063 A1 4/2013 Geisner et al.
2013/0106674 A1 5/2013 Wheeler et al.
2013/0117707 A1 5/2013 Wheeler et al.
2013/0120224 A1 5/2013 Cajigas et al.
2013/0125066 A1 5/2013 Klein et al.
2013/0182891 A1 7/2013 Ling
2013/0191178 A1 7/2013 Thompson et al.
2013/0194389 A1 8/2013 Vaught et al.
2013/0226528 A1 8/2013 Hodgins et al.
2013/0227017 A1 8/2013 Gahlings

(56) References Cited

U.S. PATENT DOCUMENTS

| | | | |
|---|---|---|---|
| 2013/0241805 | A1 | 9/2013 | Gomez |
| 2013/0246967 | A1 | 9/2013 | Wheeler et al. |
| 2013/0263016 | A1 | 10/2013 | Lehtiniemi et al. |
| 2013/0278531 | A1 | 10/2013 | Pisaris-Henderson |
| 2013/0293468 | A1 | 11/2013 | Perez et al. |
| 2013/0321265 | A1 | 12/2013 | Bychkov et al. |
| 2013/0335301 | A1 | 12/2013 | Wong et al. |
| 2013/0335303 | A1 | 12/2013 | Maciocci et al. |
| 2013/0335447 | A1 | 12/2013 | Lu et al. |
| 2013/0336629 | A1 | 12/2013 | Mulholland et al. |
| 2014/0063054 | A1 | 3/2014 | Osterhout et al. |
| 2014/0063055 | A1 | 3/2014 | Osterhout et al. |
| 2014/0101608 | A1 | 4/2014 | Ryskamp et al. |
| 2014/0111427 | A1 | 4/2014 | Lindley et al. |
| 2014/0164921 | A1 | 6/2014 | Salinas |
| 2014/0172906 | A1 | 6/2014 | Sud et al. |
| 2014/0229850 | A1 | 8/2014 | Makofsky et al. |
| 2014/0267581 | A1 | 9/2014 | Cronin |
| 2014/0280502 | A1 | 9/2014 | Cronin |
| 2014/0280503 | A1 | 9/2014 | Cronin |
| 2014/0280504 | A1 | 9/2014 | Cronin |
| 2014/0280505 | A1 | 9/2014 | Cronin |
| 2014/0280506 | A1 | 9/2014 | Cronin |
| 2014/0280644 | A1 | 9/2014 | Cronin |
| 2014/0282113 | A1 | 9/2014 | Cronin |
| 2014/0310643 | A1 | 10/2014 | Karmanenko et al. |
| 2015/0007114 | A1 | 1/2015 | Poulos et al. |
| 2015/0009132 | A1 | 1/2015 | Kuriya et al. |
| 2015/0062114 | A1 | 3/2015 | Ofstad |
| 2015/0123997 | A1 | 5/2015 | Hayasaka et al. |
| 2015/0212322 | A1 | 7/2015 | Moravetz |
| 2015/0213778 | A1 | 7/2015 | Moravetz |
| 2017/0004654 | A1 | 1/2017 | Moravetz |
| 2017/0090460 | A1 | 3/2017 | Andrew et al. |
| 2017/0150103 | A1 | 5/2017 | Cronin |
| 2017/0242479 | A1 | 8/2017 | Cronin |
| 2018/0082483 | A1 | 3/2018 | Moravetz |
| 2018/0097915 | A1 | 4/2018 | Cronin |
| 2019/0306276 | A1 | 10/2019 | Cronin |
| 2020/0329123 | A1 | 10/2020 | Cronin |

FOREIGN PATENT DOCUMENTS

| | | |
|---|---|---|
| EP | 1 679 577 | 7/2006 |
| EP | 2 378 781 | 10/2011 |
| JP | H10-222287 | 8/1998 |
| JP | H11-095971 | 4/1999 |
| JP | 2003-280805 | 10/2003 |
| JP | 2011-228859 | 11/2011 |
| JP | 2013-168910 | 8/2013 |
| JP | 2013-258614 | 12/2013 |
| JP | 2018-190429 | 11/2018 |
| KR | 10-2011-0094693 | 8/2011 |
| RU | 111703 | 12/2011 |
| WO | WO 2013/138607 | 9/2013 |
| WO | WO 2015/112359 | 7/2015 |
| WO | WO 2015/112361 | 7/2015 |

OTHER PUBLICATIONS

Brazilian Patent Application No. BR1120160171810 Preliminary Office Action dated Apr. 28, 2020.
U.S. Appl. No. 16/792,793 Office Action dated Jul. 23, 2020.
U.S. Appl. No. 15/447,342 Office Action dated Feb. 5, 2020.
U.S. Appl. No. 16/445,008 Office Action dated Mar. 23, 2020.
Chinese Patent Application No. 2015-80005727.1 Third Office Action dated Jun. 13, 2019.
Chinese Patent Application No. 2015-80005727.1 Search Report dated Jun. 13, 2019.
U.S. Appl. No. 15/447,342 Final Office Action dated Sep. 5, 2019.
U.S. Appl. No. 14/460,272 Final Office Action dated Nov. 27, 2019.
U.S. Appl. No. 14/460,272 Final Office Action dated Feb. 22, 2018.
U.S. Appl. No. 14/460,272, John Cronin, Personal Digital Assitance and Virtual Reality, filed Aug. 14, 2014.
U.S. Appl. No. 14/460,273, John Cronin, Real Time Unified Communications Interaction of a Predefined Location in a Virtual Reality Location, filed Aug. 14, 2014.
U.S. Appl. No. 14/460,275, John Cronin, Crowd and Cloud Enabled Virtual Reality Distributed Location Network, filed Aug. 14, 2014.
U.S. Appl. No. 14/460,276, John Cronin, System and Methods for Effective Virtual Reality Visitor Interface, filed Aug. 14, 2014.
U.S. Appl. No. 14/460,280, John Cronin, Virtual Reality Enhanced Through Browser Connections, filed Aug. 14, 2014.
A Quality of Experience Model for Haptic Virtual Environments; Hamam et al., ACM Transaction on Multimedia Computing, Communications and Applications, vol. 10, No. 3, Article 28, pp. 1-23, Apr. 2014.
Hollerer, T., et al., "User interface management techniques for collaborative mobile augmented reality", Computers and Graphics, 25(5):799-810, Dec. 2001.
Chinese Patent Application 2015-80005815.1 First Office Action dated Oct. 30, 2017.
European Patent Application 15740676.0 Extended European Search Report dated Jul. 6, 2017.
Japanese Patent Application 2016-548227 Notification of Reason(s) for Refusal dated Jul. 18, 2017.
Japanese Patent Application 2018-108517 Non-Final Notification of Reason(s) for Refusal dated Apr. 16, 2019.
Russian Patent Application No. 2016134577 Office Action dated Aug. 18, 2017.
Russian Patent Application No. 2016134577 Search Report dated Aug. 18, 2017.
Chinese Patent Application No. 2015-80005727.1 Second Office Action dated Dec. 11, 2018.
Chinese Patent Application No. 2015-80005727.1 Search Report dated Dec. 11, 2018.
Japanese Patent Application No. 2016-546976 Final Notification of Reason(s) for Refusal dated Jan. 22, 2019.
Japanese Patent Application No. 2016-546976 Non-Final Notification of Reason(s) for Refusal dated Jul. 31, 2018.
Japanese Patent Application No. 2016-546976 Decision for Refusal dated Jul. 18, 2017.
Japanese Patent Application No. 2016-546976 Notification of Reason(s) for Refusal dated Feb. 7, 2017.
Russian Patent Application No. 2016134268 Office Action dated Oct. 18, 2017.
Russian Patent Application No. 2016134268 Search Report dated Sep. 25, 2017.
PCT Application No. PCT/US2015/010990 International Search Report and Written Opinion dated May 11, 2015.
PCT Application No. PCT/US2015/010994 International Search Report and Written Opinion dated May 1, 2015.
U.S. Appl. No. 14/283,082 Office Action dated Jul. 1, 2016.
U.S. Appl. No. 15/447,342 Office Action dated Apr. 18, 2019.
U.S. Appl. No. 14/283,083 Office Action dated Sep. 30, 2015.
U.S. Appl. No. 15/239,382 Office Action dated Mar. 9, 2017.
U.S. Appl. No. 15/813,032 Office Action dated Jan. 24, 2018.
U.S. Appl. No. 14/460,272 Office Action dated Apr. 18, 2019.
U.S. Appl. No. 14/460,272 Office Action dated Jul. 5, 2017.
U.S. Appl. No. 14/460,272 Final Office Action dated Aug. 3, 2016.
U.S. Appl. No. 14/460,272 Office Action dated Jan. 14, 2016.
U.S. Appl. No. 14/460,273 Office Action dated May 15, 2019.
U.S. Appl. No. 14/460,273 Final Office Action dated Oct. 12, 2018.
U.S. Appl. No. 14/460,273 Office Action dated May 24, 2018.
U.S. Appl. No. 14/460,273 Final Office Action dated Nov. 2, 2017.
U.S. Appl. No. 14/460,273 Office Action dated May 10, 2017.
U.S. Appl. No. 14/460,275 Office Action dated Aug. 6, 2018.
U.S. Appl. No. 14/460,275 Final Office Action dated Nov. 8, 2017.
U.S. Appl. No. 14/460,275 Office Action dated Apr. 13, 2017.
U.S. Appl. No. 14/460,276 Final Office Action dated Oct. 15, 2018.
U.S. Appl. No. 14/460,276 Office Action dated May 8, 2018.
U.S. Appl. No. 14/460,276 Final Office Action dated Nov. 9, 2017.
U.S. Appl. No. 14/460,276 Office Action dated Apr. 13, 2017.
U.S. Appl. No. 14/460,277 Office Action dated Sep. 1, 2016.
U.S. Appl. No. 15/832,022 Office Action dated Sep. 7, 2018.
U.S. Appl. No. 14/460,279 Final Office Action dated Feb. 1, 2018.

(56) References Cited

OTHER PUBLICATIONS

U.S. Appl. No. 14/460,279 Office Action dated Jun. 15, 2017.
U.S. Appl. No. 14/460,280 Final Office Action dated Oct. 30, 2018.
U.S. Appl. No. 14/460,280 Office Action dated Jun. 14, 2018.
U.S. Appl. No. 14/460,280 Final Office Action dated Nov. 9, 2017.
U.S. Appl. No. 14/460,280 Office Action dated Apr. 18, 2017.
U.S. Appl. No. 14/460,281 Final Office Action dated Feb. 29, 2016.
U.S. Appl. No. 14/460,281 Office Action dated Oct. 8, 2015.
U.S. Appl. No. 15/377,288 Office Action dated Aug. 29, 2017.
SCEA-13038IN Indian Patent Application 201627025642 Examination Search Report dated Aug. 19, 2020.
U.S. Appl. No. 16/943,694 Office Action dated Sep. 16, 2020.
U.S. Appl. No. 16/445,008 Final Office Action dated Aug. 19, 2020.

* cited by examiner

VIRTUAL REALITY UNIVERSE REPRESENTATION CHANGES VIEWING BASED UPON CLIENT SIDE PARAMETERS

CROSS-REFERENCE TO RELATED APPLICATIONS

The present application is a continuation and claims the priority benefit of U.S. patent application Ser. No. 15/832,022 filed Dec. 5, 2017, now U.S. Pat. No. 10,320,946, which is a continuation and claims the priority benefit of U.S. patent application Ser. No. 14/460,277 filed Aug. 14, 2014, now U.S. Pat. No. 9,838,506, which is a continuation and claims the priority benefit of U.S. patent application Ser. No. 14/147,433 filed Jan. 3, 2014, which claims priority to and the benefit of U.S. provisional patent application 61/786,576 filed Mar. 15, 2013, and the disclosures of which are incorporated herein by reference.

BACKGROUND OF THE INVENTION

1. Field of the Invention

The present invention relates generally to computer-generated virtual reality representations of locations. Specifically, the present invention relates to changing the representation the visitor sees based upon the visitors computer environment.

2. Description of the Related Art

Virtual reality (VR) models and simulates views from a location in virtual space. The visitor perceives the view from virtual space on a computer monitor or specialized display, and experiences "movement" by changing position or orientation within the virtual space. The visitor may even be "teleported" to different points in the virtual space.

Although recognized as having substantial potential, virtual reality has remained limited mainly to certain types of computer system and hardware, such as high speed fast desktops with high speed network connections. Visitors like to be able to keep up seamlessly with virtual reality programs from on device, such as a desktop or laptop to a tablet or even smartphone. As explained below, virtual reality representation models use a "single virtual space representation," and a "single authoring virtual reality representation" Because of this, the designer, by representing only a "single representation" limits the market size and visitor acceptance of VR programs. These factors have hindered broader adoption of virtual reality.

A virtual reality representation models a single volume, area, or point within virtual space. The representation may model physical space, such as a location or region on the Earth, or may model imaginary space in a video game. The visitor can move around in the virtual space, but is limited to remaining in that virtual space.

Two authors may create virtual reality representations of the same location, or of related locations. These representations may exist on different websites, servers, or computers. The prior art (U.S. Pat. No. 7,298,378, Virtual Reality Universe Realized as a Distributed Location Network, issued Nov. 20, 2007 by Hagenbach et. al.) shows a comprehensive way of organizing or searching these representations and offering them to the visitor so that they may be logically viewed together.

In particular, U.S. Pat. No. 7,298,378 prior art shows that the representations are connected together in a way that enables the visitor to experience both representations. For example, if the locations modeled the same physical location, the visitor could choose which representation to experience. If the locations modeled adjacent physical locations, the visitor could experience moving from one virtual location to another. This creates a "virtual universe" made of separate virtual reality representations that can be toured by visitors.

In U.S. Pat. No. 7,298,378, the representations generated by different authors are logically connected together in a virtual universe, allowing for a simplification of authoring of virtual reality representations. The programming and graphic skills required by conventional VR software makes creation of virtual reality representations a relatively complex and expensive process. The easier and faster virtual reality representations can be created, the easier and faster a rich and varied virtual universe can be created and offered to visitors.

However, the prior art provides only a single VR representation of a VR space by a single author. Multiple authors creating multiple VR representations of a single VR space provide the same view-types based upon generally similar high density graphical representations that lead to high quality imaging. This means that visitor computer processor speeds, processor loads, connection speeds and browser version can play a significant role on the quality of the experience of the VR Universe. Also, this results in a lack of seamless use between differing devices such as smartphones, tables, laptops and desktops, since each can have various processor speeds, processor loads, connection speeds and browser versions.

Thus there is a need for logically connecting virtual reality representations together to form a virtual universe that allows for an improved visitor experience for a single visitor even if the visitor has either a computer that has processor speeds, processor loads, connection speeds and browser versions that was not optimized for the authors graphical representation or whereby the visitor has multiple computers that they want to use seamlessly on the VR universe where each device has differing processor speeds, processor loads, connection speeds and browser versions. In addition to conventional virtual reality software, a simplified method of creating virtual reality representations for computers that have various processor speeds, processor loads, connection speeds and browser version is needed to encourage creation of the virtual universe.

SUMMARY OF THE CLAIMED INVENTION

The claimed invention is a network capable of connecting virtual reality representations together to form a virtual universe. The virtual reality representations can be in a simplified virtual reality format that requires no special computer programming or graphics skills to create. Further the virtual reality representations are authored in such a way as to improve the visitor experience for those who may wish to view the virtual reality representations on computer devices that have various processor speeds, processor loads, connection speeds and browser versions.

A network in accordance with the present invention includes a number of virtual reality representations, each virtual reality representation representing a location in a virtual universe and defined by VR data stored on the network at a network address.

A database stores the network address and the location in the universe of each virtual reality representation. A database server provides access to the database. The database server generates a list of locations in response to a location query from a visitor, and provides the network address of the virtual reality representation of a selected location. The database also has various virtual reality representations (VR representations) of a single VR location, optionally at different levels of quality. These VR representations of a single VR location are authored in such a way that a particular VR representation of a single VR location can be displayed on a visitor's computer based on the capabilities of the visitor's computer, such as for example the computer's processor speed, processor load, connection speed, and browser version.

The visitor connects to the network using a client host adapted to communicate with the domain server. The client host adapter queries the visitor's computer device for the relevant device processor speeds, processor loads, connection speeds and browser version. The host receives data representing the network address of the VR data server associated with a selected VR representation. The host is also adapted to communicate with the VR data server to access the VR data set defining the VR representation, in which the VR representation is best matched to the visitors device processor speeds, processor loads, connection speeds and browser version.

In using the network, the visitor is preferably presented with a map displaying locations in the virtual universe. Each location is associated with a virtual reality representation accessible through the network. The visitor selects a location on the map he or she desires to visit. The domain server receives the selected location and retrieves from the database the network location of the data server providing access to the selected virtual reality representation, in which the VR representation is best matched to the visitors device processor speeds, processor loads, connection speeds and browser version. The domain server transmits the network address of the data server to the host, and the host communicates with the data server to receive the VR data defining the virtual reality representation, in which the VR representation is best matched to the visitors device processor speeds, processor loads, connection speeds and browser version.

In one possible embodiment, the client host includes a monitor that displays both the map and the virtual reality presentation generated from the VR data. In other possible embodiments the virtual reality presentation can utilize specialized hardware separate from the map display. In other possible embodiments, the map may be displayed to the user on a first device at a first quality best matched to a visitors first device's processor speed, processor load, connection speed and browser version; and the VR presentation could be displayed to the user on a second device at a second quality best matched to the visitors second device's processor speed, processor load, connection speed and browser version.

In preferred embodiments of the present invention, the network stores data representing paths in the virtual universe as well as multiple instantiations of a VR representation of a single location of differing quality (data size of images). A path is defined by at least two different locations in the universe. When the domain server receives a message from the host requesting virtual movement from a first location to a second location, the domain server communicates the network address of the data server associated with the second location to the host. The host then communicates with that data server and transitions from the first VR presentation to the VR presentation of the second location. The visitor perceives a substantially continuous movement along the path from the first location to the second location without leaving the virtual universe.

Paths can be defined in different ways in alternative embodiments of the network. The domain server can store predefined path definitions by storing a list of the locations defining the path. Paths can also have indications of various levels of quality of experience based upon data representations, so a visitor can select a higher or lower quality path based upon the visitors device processor speeds, processor loads, connection speeds and browser version, or based upon their desire to travel faster at lower speeds to get a general idea of a VR space (possibly a thumbnail version) before investigating that VR space at a higher quality. This greatly enhances the visitor experience.

Alternatively, the domain server stores at least one data record for each location in the universe, but may store multiple data records of differing quality of the images of the same VR location. The data set records the adjacent locations in the universe to define a path from each location to adjacent locations. In other alternative embodiments the path is defined in response to system events and then made available to the visitor.

The network preferably includes administrative software that enables new virtual reality representations to be added to the network. The network further includes software to determine the visitor's device processor speed, processor load, connection speed and browser version, and to match these parameters to the optimum VR dataset quality. The virtual reality representations can be stored on existing data servers on the network, or stored on data servers that are themselves added to the network. The database is updated to reflect the new locations in the virtual universe and the network addresses of the data servers accessing the representations.

In one advantageous embodiment of the present invention, the virtual universe is divided into public and private regions. Any author can add to the network a virtual reality representation of a location in the public region of the universe. Only authorized authors can add representations in private regions of the universe.

In another advantageous embodiment of the present invention, the network is operated as a self-regulating virtual reality universe. The network preferably provides visitor access to a number of virtual reality representations, each authored by a different author. The domain server receives ratings from visitors to the quality of the virtual reality representations they visited, and assesses the quality of each virtual reality representation based on the ratings provided by the visitors. One of these ratings is image quality and access speed, whereby the system can provide feedback to the author of a VR representation to prompt the author to establish additional representations of the same VR location to meet the future need of new visitors to that location.

Action is then taken regarding a virtual reality based on the assessed quality of the virtual reality representation. The quality can be rated as a running average of visitor ratings or ratings based on image quality and access speed. If the rating falls below a predetermined score, visitor access to the representation can be removed or the representation can be removed from the network, or the author can add updated VR representations at higher quality or lower quality to deal with higher or lower speed access devices. Preferably the action is taken automatically and without human intervention so that the network is self-regulating. Alternatively, a VR site can be labeled under construction until the author is able to provide a VR representation with higher or lower quality for higher or lower speed devices.

To simplify creation of virtual reality representations, the VR data can be stored in a simplified file format that stores digital photographs taken from a specific geographic location. The photographs can be taken at various quality levels or a software tool can be used to enhance the quality or reduce the quality and data size to allow multiple copies of the same VR location. An author takes and stores a number of photographs each at various quality representations as well as various photographs at different view angles from a location with a digital camera. The photographs are preferably in JPG format but other "digital film" formats can be used. The digital photographs can be single images of sections of a video data stream. The photographs can have various quality and experience levels, such as time of day, exposure for brightness and viewing angles and viewing size. Each photograph preferably is taken in a different viewing direction, preferably viewing north, south, east, and west. The images are uploaded to the network along with geographical data (for example, latitude and longitude) that identifies where the photographs were taken. The domain server stores the images, the viewing direction associated with each image, and geographical data in a single data file on a data server. The domain server updates its database, associating the geographical location with a virtual location in the virtual universe. The virtual representation is now accessible to visitors, and the photographs are displayed when generating the virtual reality presentation of the virtual location.

A virtual reality network in accordance with the present invention offers many advantages. A number of different virtual reality representations are made available to visitors through a single, centrally accessible domain server. Each VR representation includes images stored at many quality levels to optimize the visitors experience for the device the visitor is using. The domain server enables visitors to experience virtual reality representations created by different authors, and to tour a virtual universe created by logically organizing and connecting the separate representations.

Authors can easily add new virtual reality representations to the network, enabling visitors to experience a virtual reality universe that grows richer and richer with time. With the simplified VR file format, persons may share with others their travels to places around the world, or may easily create their own virtual universe for business or private use.

Other objects and features of the present invention will become apparent as the description proceeds, especially when taken in conjunction with the accompanying eight drawing sheets illustrating an embodiment of the invention.

DETAILED DESCRIPTION

Embodiments of the present invention are a system and method for enabling a user and/or visitor utilizing a computer or other client device to visit a selected location within a virtual reality universe using virtual reality data authored by different authors where the datasets include data speed and quality metric to assist the visitors in an optimized experience. The system and method provide a plurality of data servers and a domain server interconnected with the data servers. The data servers provide access to sets of VR data of virtual representations of locations within the universe, each set of VR data is authored by a respective different author independently of the other authors. The VR data includes data speed and quality metric to assist the visitors in an optimized experience. The domain server provides access to domain data for selecting the location to visit and the network address of the data server providing access to the VR data for the selected location. The data is received from the visitor representing a selected location in the universe. The domain data is accessed in response data received from the visitor and obtains therefrom the network address of the data server that provides access to the VR data for the selected location. The VR data for the selected location is transferred from the data server to the visitor's computer or other client device for generation of a VR presentation of the selected location without leaving the virtual universe.

Users or visitors may use any number of different electronic computing client devices, which can include, but is not limited to, general purpose computers, mobile phones, smartphones, personal digital assistants (PDAs), portable computing devices (e.g., laptop, netbook, tablets), desktop computing devices, handheld computing device, or any other type of computing device capable of communicating over a communication network. Such devices are preferably configured to access data from other storage media, such as, but not limited to memory cards or disk drives as may be appropriate in the case of downloaded services. Such devices preferably include standard hardware computing components such as, but not limited to network and media interfaces, non-transitory computer-readable storage (memory), and processors for executing instructions that may be stored in memory.

Figure 1:
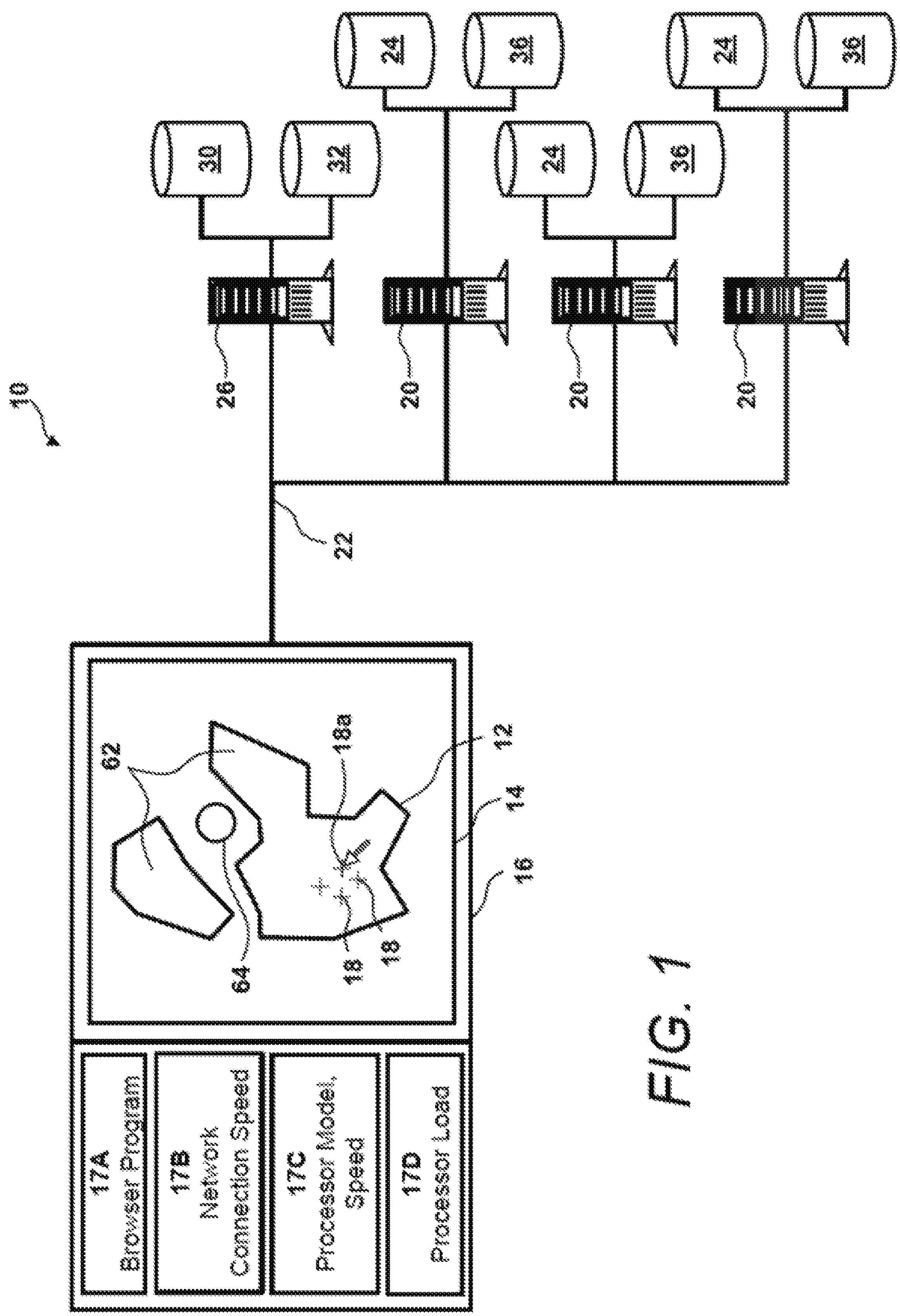
FIG. 1 is a schematic view of a virtual reality universe realized as a distributed location network in accordance with the present invention.

FIG. 1 illustrates a distributed location network 10 in accordance with the present invention.

The network 10 enables a visitor to visit and explore a virtual universe. FIG. 1 illustrates a map 12 of the virtual universe displayed on a visitor's computer monitor by a software program or virtual reality browser (VR browser) 14 running on a visitor's computer 16 connected as a network client. The universe can model a real or tangible space, such as the surface of the Earth, with the universe representing real or tangible locations in physical space. Alternatively, the universe can model an imaginary space, such as L. Frank Baum's Oz or a stick model of a protein molecule, with the universe representing imaginary locations in nonphysical space.

The network 10 is preferably a local, proprietary network (e.g., an intranet) and/or is alternatively a part of a larger wide-area network (e.g., the cloud). The network 10 can be a local area network (LAN), which is communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provide.

The visitor explores the universe by selecting and viewing virtual reality presentations of virtual locations or points 18 on the map 12. Each point 18 represents a location in the universe that has at least one virtual reality representation available for a visitor to access and experience. A point 18 can model a point, area or volume in the virtual universe and a visitor may be capable of moving about the area or volume if the virtual reality presentation enables it.

The VR browser 14 retrieves the data for the virtual reality representations from virtual reality data servers (VR data servers) 20. VR data servers 20 are connected to the browser 14 by network connections 22. The network connections 22 may be through a Local Area Network (LAN) or a global network such as the Internet. VR data servers 20 may include any type of server or other computing device as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server. VR data servers 20 are connected to the browser 14 by network connections 22. The network connections 22 may be through a Local Area Network (LAN) or a global network such as the Internet.

Each VR data server 20 provides access to VR data 24 for a virtual reality representation of the selected point 18. Data can be stored in conventional virtual reality file formats such as QUICKTIME, X3D, VRML, and the like, or can be stored as separate digital image files. VR data 24 can be stored on the VR data server 20 or stored on additional network data servers (not shown) distributed through the network 10.

The entire network 10, including the network client 16 and the servers 20 and 26, may also be hosted on a single computer if a distributed network is not required.

A point 18 may have a number of different virtual reality representations served by a number of different VR data servers 20. These representations may be stored in different file formats, may represent the point in different seasons of the year or in different historical eras, or may provide an alternative or augmented visitor interface or sensory experience. Of course, a particular data server 20 could serve a number of virtual reality representations of a point 18 or different points 18.

A domain server 26 hosts a universe database 30 for displaying the map 12 and the points 18 on the map 12. The database 30 preferably includes graphic files, image files, and other data for generating and displaying the map 12. The universe database 30 may also include the network addresses or network paths to the VR files associated with the virtual reality representations.

The domain server 26 also maintains a network database 32 that stores information about each point 18 and the network addresses of the one or more VR data servers 20 that provide access to VR representations of the point 18.

The network database 32 holds a number of virtual reality representation records (VRR records) 34.

Network Client 16 includes visitors browser program 17A, network connection 17B, computer processor model 17C and processor load measurement 17D, Each of browser program 17A, network connection 17B, computer processor model 17C and processor load measurement 17D can be queried to determine the visitors device type and the device's capability for image quality.

Figure 2:
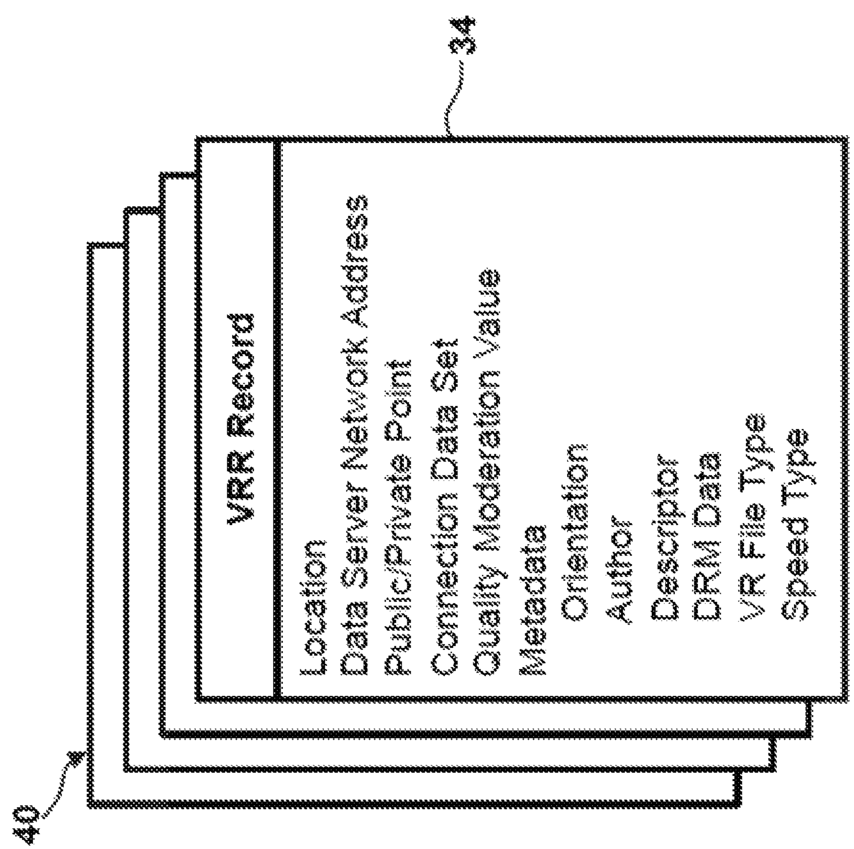
FIG. 2 is a schematic view of a virtual reality representation record used in the network shown in FIG. 1.

FIG. 2 illustrates a typical VRR record 34. The VRR record 34 is a data structure that provides information enabling the VR browser 14 to locate the VR data server 20 providing access to a specific VR representation. A VRR record 34 includes the location of the point 18 and the network address of the VR data server 20 associated with the VR representation of the point 18.

The VRR record 34 preferably also includes metadata providing additional information about the point 18, the associated VR data server 20, and the virtual reality representation of the point 18. Metadata can include the author, VR file format, or a description of the VR representation. Other metadata can include digital rights management (DRM) information, initial orientation or direction of the default opening view of the virtual reality representation, or the like. VR Record 34 additionally includes speed type, which is a representation of the range of speeds the image can be shown at for good quality.

Each VR data server 20 maintains a local database 36 that records the location or locations of the VR data 24 accessed through the VR data server 20 (see FIG. 1). The local database 36 holds a virtual reality record (VR record) 38 for each representation accessed through the VR data server 20.

Figure 3:
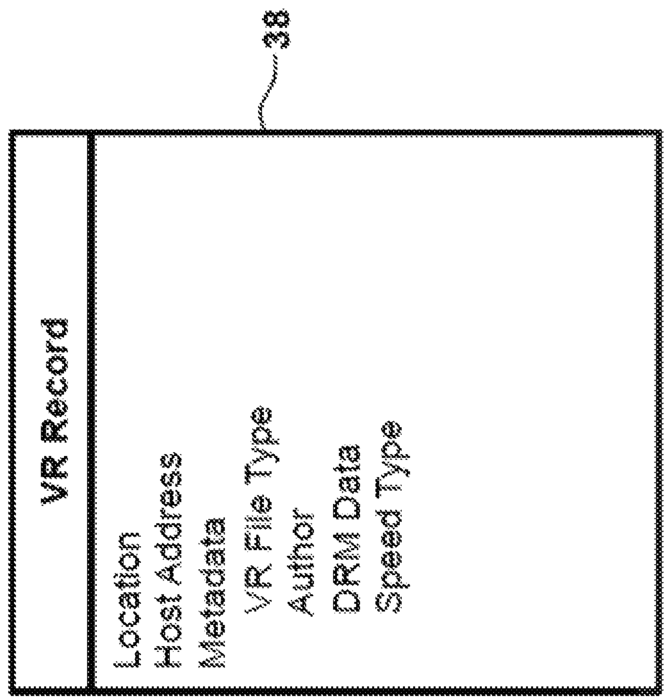
FIG. 3 is a schematic view of a virtual reality record used in the network shown in FIG. 1.

FIG. 3 illustrates a typical VR record 38. The VR record 38 is a data structure that includes the location of the point 18, the location of the VR data 24 for the representation of the point, and metadata containing further information about the VR data 24. For example, such metadata may include the author and digital rights management (DRM) information, VR data format, or descriptive information about the VR representation. VR Record 34 also includes speed type, which is a representation of the range of speeds the image can be shown at for good quality.

The universe database 30, the network database 32, or a local database 36 can be realized as a single-file relational database, object database, or hierarchal XML database. Alternatively, a database 30, 32, 36 can be realized as a number of separate data files, wherein each data record is stored in a respective data file. The data file can be in structured text file format, XML format, or other conventional data format. The selection of database schema and format is based on conventional software engineering considerations, including the network architecture, the network load, and available software.

Figure 4:
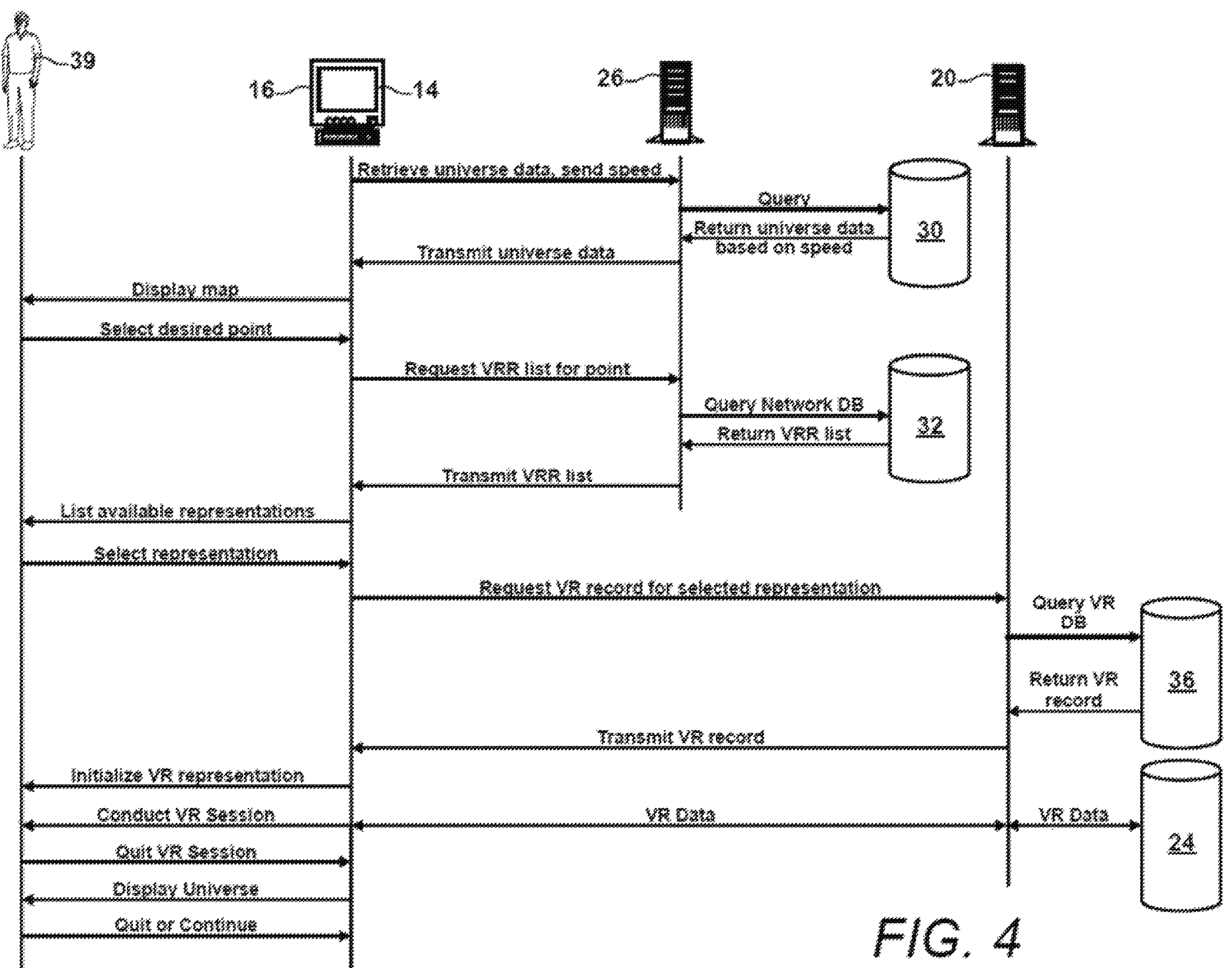
FIG. 4 is a sequence diagram illustrating a visitor utilizing a client host communicating with the network shown in FIG. 1 to view a location in the virtual universe.

FIG. 4 illustrates a first visitor session wherein a visitor 39 explores the virtual universe point-by-point. For clarity only one visitor is shown connected to the network 10, but it should be understood that a number of visitors can simultaneously explore the universe.

When the visitor 39 enters into the VR program through the VR browser 14 of visitor's computer 16, visitors browser program 17A, network connection 17B, computer processor model 17C and processor load measurement 17D of FIG. 1 is queried by the host system 26 and stored.

The VR browser 14 retrieves the map data 30 from the domain server 26 and begins the visitor session by displaying the map 12 shown in FIG. 1. The map 12 displays the points 18, and the visitor interface of the VR browser 14 enables the visitor 39 to select which point 18 and the representation of the selected point 18 he or she would like to experience. The VR representation data set shown was selected by matching the visitors device computer 16, visitors browser program 17A, network connection 17B, computer processor model 17C and processor load measurement 17D capability to the speed type of the VR Record 38, speed type of FIG. 3.

It should be understood that the universe database 30 may include or enable generation of a number of different maps representing different regions or sub-regions of the universe. The VR browser 14 may simultaneously or sequentially display different maps during a visitor session. For example, the visitor is initially presented with a "master map" or model of the entire universe. If the virtual universe is sufficiently extensive, the visitor interface of the VR browser 14 enables visitors to "drill down" and select more detailed maps or models of sub-regions (for example, maps representing a continent, a country, a city, and then a city block) to select a desired point 18.

Map 12 should therefore be understood to represent all possible maps the VR browser 14 may display as part of its visitor interface. Maps may be representations of one-dimensional, two-dimensional, three-dimensional, or n-dimensional space as is appropriate for the virtual universe such maps represent.

The map 12 may also display additional information that assists the visitor in selecting a point or a VR representation of the point. For example, the map might indicate points of historical interest or the number and types of virtual reality representations available for each point.

In the illustrated embodiment, the visitor selects a desired point 18*a* from the map 12 by clicking the mouse (see FIG. 1). The browser 14 determines the location of the selected point 18*a* on the map and requests a list 40 of VRR records 34 associated with that point from the domain server 26 (see FIG. 2).

The domain server 26 queries the network database 32 for the list of VRR records of points at or proximate to the selected point 18*a*. The domain server 26 returns the VRR list 40 to the VR browser 14. The VR browser 14 generates a list of available VR representations from the VRR list 40, and displays the list for the selected point 18*a*.

The display list can include information from the metadata to assist the visitor in selecting a VR representation to experience. For example, the VR browser 14 might display an icon for each representation indicating some characteristic of the representation (such as season of the year, its VR file format, or quality moderation value (discussed in further detail below)).

The visitor selects from the display list the desired virtual reality representation to experience. If there is only one representation associated with the selected point, the steps of displaying and selecting from the list can be eliminated.

The VR browser 14 uses the VRR record 34 associated with the selected representation to look up the network address of the VR data server 20 providing access to the virtual representation. The VR browser 14 requests the VR record 38 for the selected representation from the VR data server 20. The VR browser 14 uses the returned VR record 38 to fetch the VR data file 24 and initialize a virtual reality presentation that will be perceived and experienced by the visitor 39. For example, the VR browser 14 could start one helper application to display a QUICKTIME presentation and another helper application to display a VRML presentation.

In the illustrated embodiment, the VR browser 14 displays the map 12 in a first window and the virtual reality presentation in a second window (discussed in greater detail later). In other embodiments, virtual reality presentations could be displayed independently of the VR browser 14 through more specialized or augmented VR hardware, such as a headset.

Initially, upon entering into the VR browser 14, the visitors device computer 16 capability is determined by server 26 by querying the visitors device computer 16 of visitors browser program 17A, network connection 17B, computer processor model 17C and processor load measurement 17D (of FIG. 1.) to calculate a speed type that will be matched later to the speed type of the VR Record 38, speed type of FIG. 3. The speed data is sent as well as a request to "retrieve universe data". Sever 26 send a query to dataset 30, to select the correct VR data based upon the location as well as the correct speed type for best match of quality of the visitors device. During the VR presentation, the VR browser 14 receives input from the visitor and communicates with the VR data server 20 to fetch the VR data 36. The visitor can change the point of view and move about the presentation as permitted by the virtual reality representation being experienced. When the visitor ends the VR presentation, the window displaying the VR presentation closes or goes blank. The visitor 39 can then select a new point 18 or quit the application.

In addition to exploring selected points 18, the network 10 enables the visitor 39 to explore paths through the universe. See, for example, path 42 shown in FIG. 5. A path is defined as extending along a set of points or extending between start and end points in the universe. The network 10 supports multiple types of paths as will be described in further detail below.

A visitor sequentially experiences virtual reality presentations of the points 18 on the path. The VR browser 14 automatically moves from displaying one VR presentation to the next in response to visitor input indicating movement along the path. This provides the visitor with the perception of walking through or being "immersed" in the universe. If the points 18 are sufficiently close together, the visitor will essentially perceive continuous or seamless movement through the virtual universe.

Path 42 represents a pre-defined path. A pre-defined path is defined prior to the visitor session and may, for example, represent a virtual river, highway, or historical trail through the universe. Pre-defined paths are preferably defined in the universe database 30 and represented on the map 12 for selection by the visitor 39.

Figure 5:
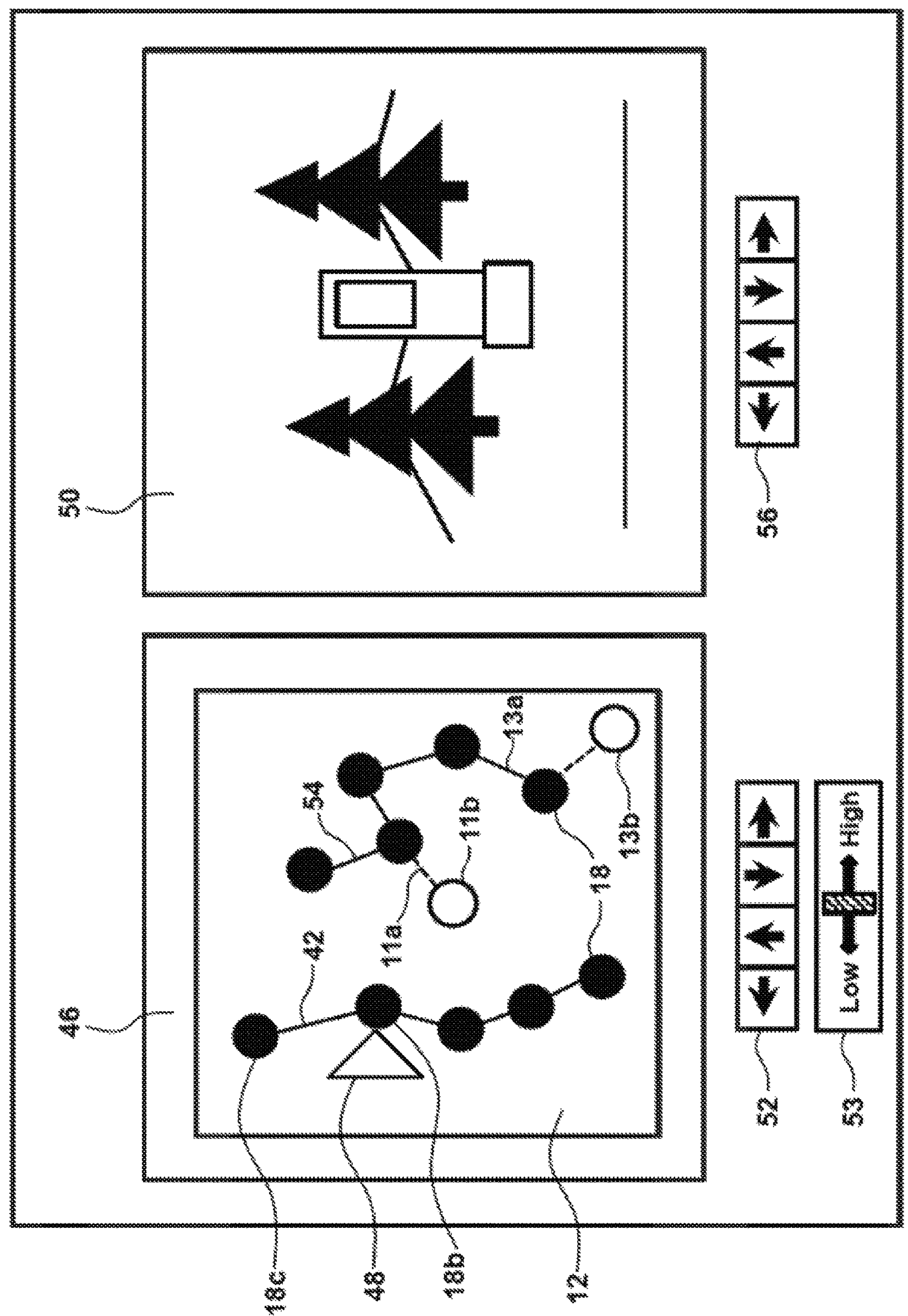
FIG. 5 is a view of the client host display displaying a map of the universe and a virtual reality presentation of a location in the virtual universe.

FIG. 5 illustrates the VR browser 14 with a first display window 46 and a second display window 50. Display window 46 displays the map 12, the path 42, and the points 18 along the path 42 as shown. The second window 50 displays the virtual reality presentation of the active, or currently visited, point 18*b*.

When displaying a virtual reality presentation of a point 18, the VR browser 14 preferably displays an icon 48 indicating the active point 18. The illustrated icon 48 is an arrow that also indicates the approximate direction of the current line of view of the virtual reality presentation shown in the second window 50. Icon 48 is shown indicating that point 18*b* is the active point and that the direction of the current line of view is west.

Navigation widgets 52 associated with the first window 46 enable the visitor to move along the path 42 or to move to a different path (such as a second path 54). Navigation widgets 56 associated with the second window 50 enable the visitor to change the line of view of the VR presentation in the second window 50. Widgets 52 and 56 can be combined into a single control if desired, and alternative known interface controls (including the mouse) or other interface widgets may replace or be used with the widgets 52, 56.

Also shown are various "quality paths". Path 54 may be the path best chosen for the VR representation data set selected as best match between the speed type of the VR Record 38 (of FIG. 3) and the visitors device computer 16, visitors browser program 17A, network connection 17B, computer processor model 17C and processor load measurement 17D (of FIG. 1). However, path 11*a* to point 11*b* may be lower quality than the visitor's device capability and path 13*a* and point 13*b* might be of better quality than the visitor's device capability. In this way, the visitor can optimize the journey they might want to take based on the capabilities of their device and connection Optionally, the visitor can select the quality level preferred, using speed type indicator 53. By selecting a speed higher or lower than that which was selected as best match to the visitor's device, the visitor may be able to optimize the journey, initially moving through paths at low quality and stopping on a point and enhancing the quality (that may be low speed data loading). In this way the visitor can improve the quality of the experience.

Figure 6:
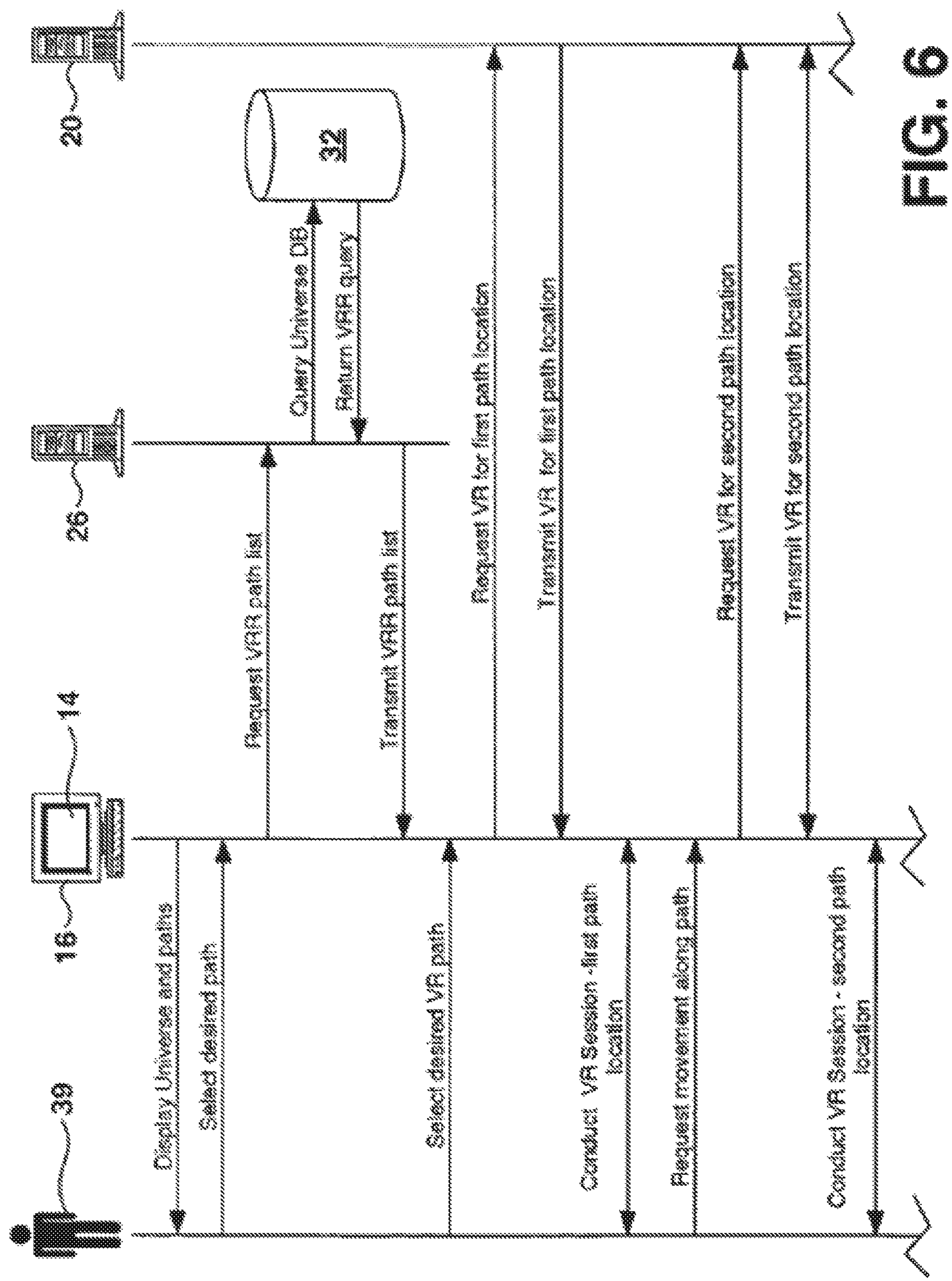
FIG. 6 is a sequence diagram similar to FIG. 4 illustrating a visitor moving along a path in the virtual universe.

FIG. 6 illustrates a second visitor session in which the visitor moves along and explores the path 42 (the database 36 and VR data 24 are omitted from the drawing). The VR browser 14 retrieves the map and path data from the universe database 30 and displays the map 12 as shown in FIG. 5.

The visitor selects the desired path 42, and the VR browser 14 obtains the VRR record list 40 for the points 18 on the path 42 from the domain server 26. For simplicity, it is assumed that each point 18 on the path 42 has only one virtual reality representation; so each VRR record 34 is associated with a single point 18 on the path 42.

The VR browser 14 uses the VRR record 34 associated with the path's starting point 18*c* to look up the network address of the appropriate VR data server 20 and retrieves the VR record 38 from that server 20. The VR record data is used to initialize and display the virtual reality presentation of the first or starting point 18*c* (see FIG. 5). Widgets 56 control the line of view of the virtual reality presentation as described.

Widgets 52 move the visitor to the next or second point on the path 42. The VR browser 14 uses the VRR record 34 associated with the next point to retrieve VR data for the next point. If the points 18 along the path 42 are sufficiently close, the transition from point to point appears to the visitor as a continuous movement along the path.

In moving from the virtual reality representation of one point to another, the VR browser 14 may also maintain (as closely as possible) the same line of view to maintain the appearance of continuous movement. For example, if the visitor is looking south and moves to the next point, the initial line of view for the next point is also viewing south. In alternative embodiments, however, the VR browser 14 can initialize each virtual reality presentation with a predetermined or default line of view.

Figure 7B:
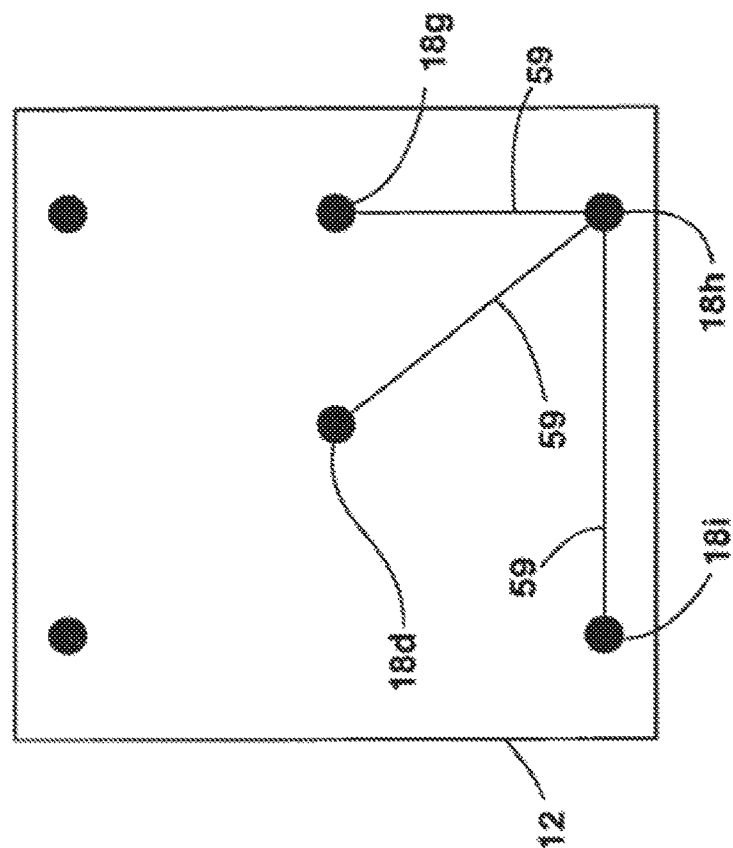
FIGS. 7*a* and 7*b* represent paths in the virtual universe extending between adjacent locations in the universe.
Figure 7A:
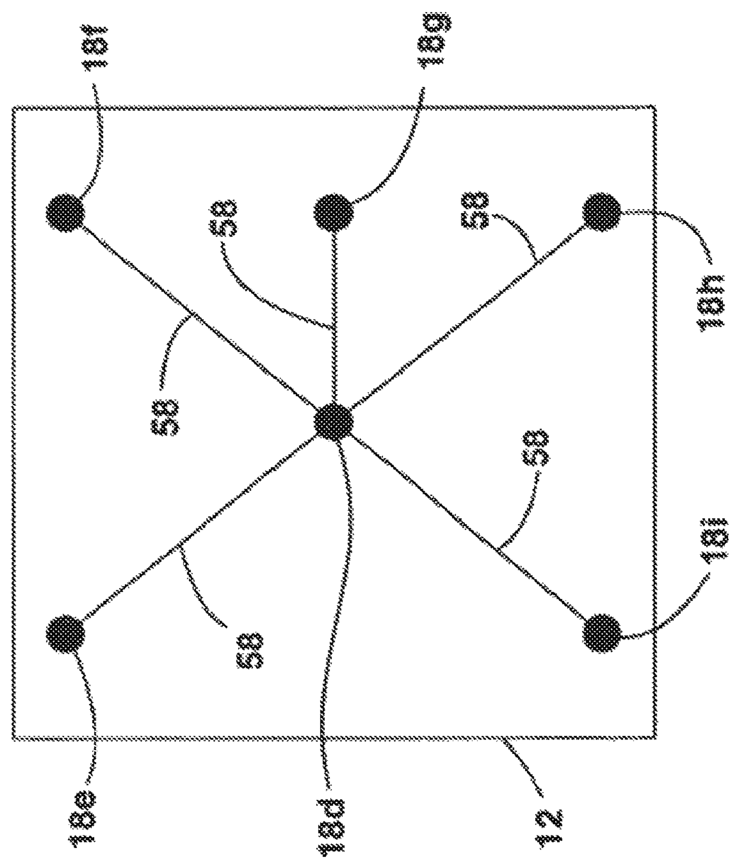

A second type of path preferably supported by the network 10 is a connection path. A connection path is a dynamic path generated from an active point 18 to adjacent points 18 during the visitor session. FIG. 7*a* illustrates the map 12 displaying connection paths 58 extending between an active point 18*d* and adjacent points 18*e*-18*i*. Connection paths 58 connect two adjacent or neighboring points 18, enabling the visitor to pick and choose his or her own route through the universe.

The connection paths 58 typically provide multiple routes between points. For example, the visitor can move from point 18*d* to point 18*h* directly, or can move first to point 18*g* and then to point 18*h*. FIG. 7*b* illustrates the connection paths 59 when the visitor reaches point 18*h*. The paths 59 start from point 18*h* and end at points 18*d*, 18*g*, and 18*i*.

The VRR record(s) 34 for each point 18 preferably includes a connection data set (see FIG. 2) that lists adjacent points 18. For example, the connection data set for point 18*d* (shown in FIG. 7*a*) includes point's 18*e*-18*i* and the direction to each point. This enables the VR browser 14 to display the connection paths 58 available to the visitor; the VR browser 14 can also iteratively retrieve the VRR records of adjacent points to display a network of available paths on the map 12. The connection data set also allows the VR browser 14 to efficiently respond and display the next virtual reality presentation after receiving a visitor request to move in a given direction from active point 18*d*.

The domain server 26 generates the connection data set when a new point 18 is added to the network. The adjacent points 18 are retrieved from the universe database 30 to generate the connection data set for the new point 18.

Figure 9:
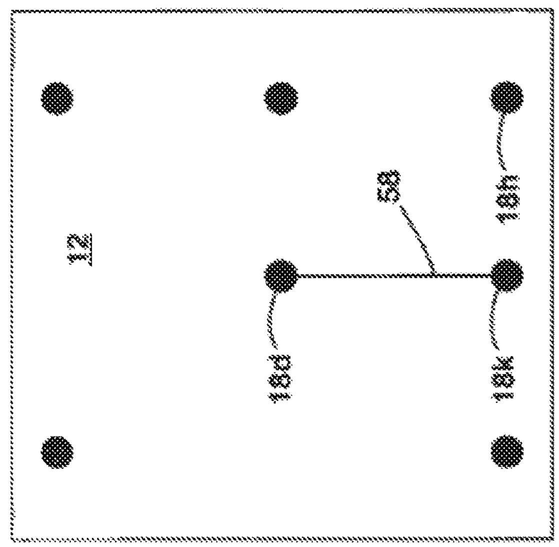
FIGS. 8-10 illustrate other paths in the virtual universe.
Figure 8:
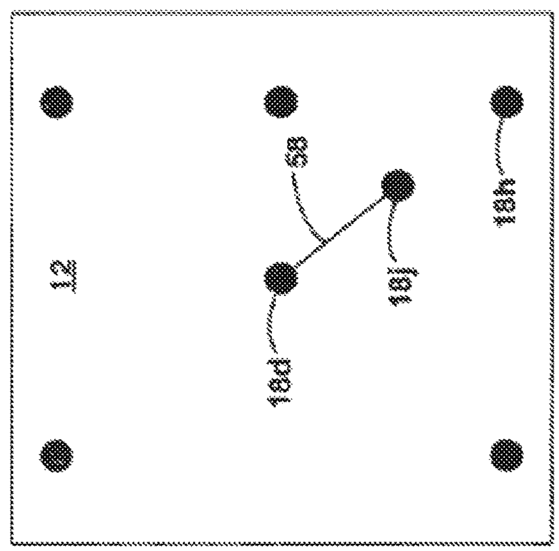

The domain server 26 also modifies the connection data set of adjacent points 18 as illustrated in FIGS. 8 and 9. The maps 12 in FIGS. 8 and 9 are otherwise identical to the map 12 in FIG. 7*a*, but include a later-added point 18*j* or 18*k*, respectively. In FIG. 8, point 18*j* is inserted between points 18*d* and 18*h*. Point 18*j* is now adjacent to point 18*d* instead of point 18*h*. The connection data set associated with point 18*d* is modified to remove point 18*h* and to insert point 18*j* for the connection path 58 extending between points 18*d* and 18*j*. In FIG. 9, point 18*k* is an additional point adjacent to point 18*d*.

Point 18*k* is added to the data connection set associated with point 18*d* for the connection path 58 extending between points 18*d* and 18*k*.

A visitor can also preferably edit the connection data set for a point 18 to add or subtract connection paths extending from the point. The visitor can add a remote point 18 to the data set, creating a connection path to that remote point. A point can be removed from the data set, eliminating a connection path. The modified data set can be stored on the visitor's machine 16 for use only by the visitor's browser 14, or the modifications can be saved in the network database 32 to be made available to all visitors.

A third type of path supported by the network 10 is the event path. An event path is a dynamic path generated by the network in response to an event or visitor query. For example, the visitor 39 may request the path from his or her current location to another location in the universe. The VR browser 14 queries the universe database 30 and displays the points 18 along the path on the map 12.

Figure 10:
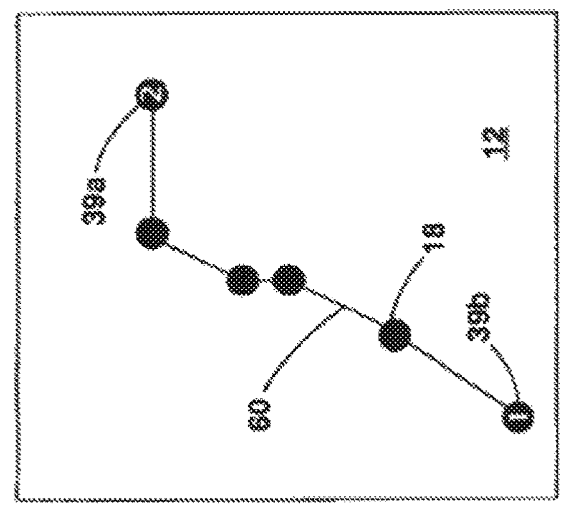

FIG. 10 illustrates an event path 60 generated by an event. The domain server 26 maintains a list of active visitors on the network 10 and the current location of each visitor in the universe. The map 12 displays the positions of all the visitors 39 and the path to each visitor. For clarity only two active visitors 39*a*, 39*b* and one path 60 between them are shown in FIG. 10. Paths 60 are automatically updated as visitors move about in the universe and as visitors join and leave the network.

A fourth type of path supported by the network is the visitor-defined path. Path 54 (see FIG. 5) represents a visitor-defined path. The visitor defines the end points and the points 18 of the path 54. The path can be created, for example, by inputting a list of the points 18 defining the path or by having the VR browser 14 maintain and store a history of the points 18 visited by the visitor in prior visits.

The definition of the visitor-defined path 54 may be stored on the visitor's machine 16 for use only by the visitor 39. Alternatively, the path definition is stored in the universe database 30 and made available to all network visitors.

As described above, the domain server 26 provides a single point of access for the VR browser 14 to initiate a visitor session and display a map of available points 18 in the universe. This enables new points 18 to be added to the universe and new virtual reality representations of new or existing points 18 to be made available to all VR browsers 14 on the network 10 by updating the domain server databases 30 and 32.

An author creating a virtual reality representation for a new or existing point 18 stores the data on his or her own VR data server 20 and then connects the VR data server to the network 10. The author remotely invokes an administrative program on the domain server 26 that adds the location to the universe database 30 and adds a new VRR record 34 to the network database 32. The new VRR record 34 includes the location of the new point 18 and the network address of the associated VR data server 20. The VR browser 14 automatically generates an up-to-date map 12 when it retrieves the map data from the universe database 30.

If desired, the client machine 16 can cache VR data 34 as well as records from the databases 30, 32, and 36 for improved performance. The VR browser 14 uses the local data cache to display the map and to retrieve VR data from the network 10. However, the data cache should be refreshed regularly or at the visitor's command to prevent stale data. Alternatively, the database records can include a "Time to Live" field for automatic updating of the data caches.

To facilitate creation of VR representations of points 18, the universe is preferably divided into a public region and a private region. Authors are free to add virtual reality representations of any point in the public region. Only authorized authors can add virtual representations of private regions.

To illustrate the concept of public and private regions in more concrete terms, the map 12 is a virtual representation of the Gettysburg National Military Park 62 and the adjacent borough of Gettysburg, Pa. 64. See FIG. 1; the borough of Gettysburg is represented schematically as a circular area. The Military Park 62 is a public region of the universe and the borough of Gettysburg 64 is a private region of the universe.

Tourists or Civil War buffs can author a virtual reality representation for a new point 18 in the Military Park 62 or author an additional virtual reality representation for an existing point 18. The author can provide visitor access to the representation through a publicly or privately available VR data server 20. The author updates the domain server databases 30, 32 through the administrative software as previously described and updates the local database 36 and stores the VR data 24 on the data server 20. The new point and its representation are now available to all visitors.

Over time, the number of points in the universe having virtual reality representations increases and the number of representations for a given point increases. This enables visitors to select points and view presentations that provide them with a rich and varied virtual visit to the virtual Military Park 62.

To further encourage the creation and selection of high-quality virtual presentations, each representation of a public point 18 is preferably assigned a quality moderation value. A quality moderation value represents the quality of the representation and assists visitors in selecting which representations to view. The quality moderation value is preferably stored in the representation's VRR record 34 (see FIG. 2) and is displayed on the map 12.

For example, a representation can be assigned a quality moderation value between 0 and 10, where 0 represents a low quality representation and 10 represents a high quality representation. A visitor can rate the quality of the representation after experiencing the virtual reality presentation. A running average of visitors' ratings is stored as the representation's quality moderation value. This mechanism enables the network 10 to be self-moderating in that representations whose quality falls below a minimum value can be automatically removed from the network or not listed for selection.

Virtual reality representations of points within Gettysburg borough 64, however, are limited to authorized authors. Examples of such authors may include owners of commercial establishments who wish to control the content of the virtual reality representation of their store or business. A private representation may be hosted on a VR data server 20 whose access is controlled by the author and may or may not be assigned a quality moderation value.

Virtual reality representations of public points are preferably created in a simple, standardized format to encourage those without technical or computer expertise to contribute virtual reality representations to the network 10.

Figure 11:
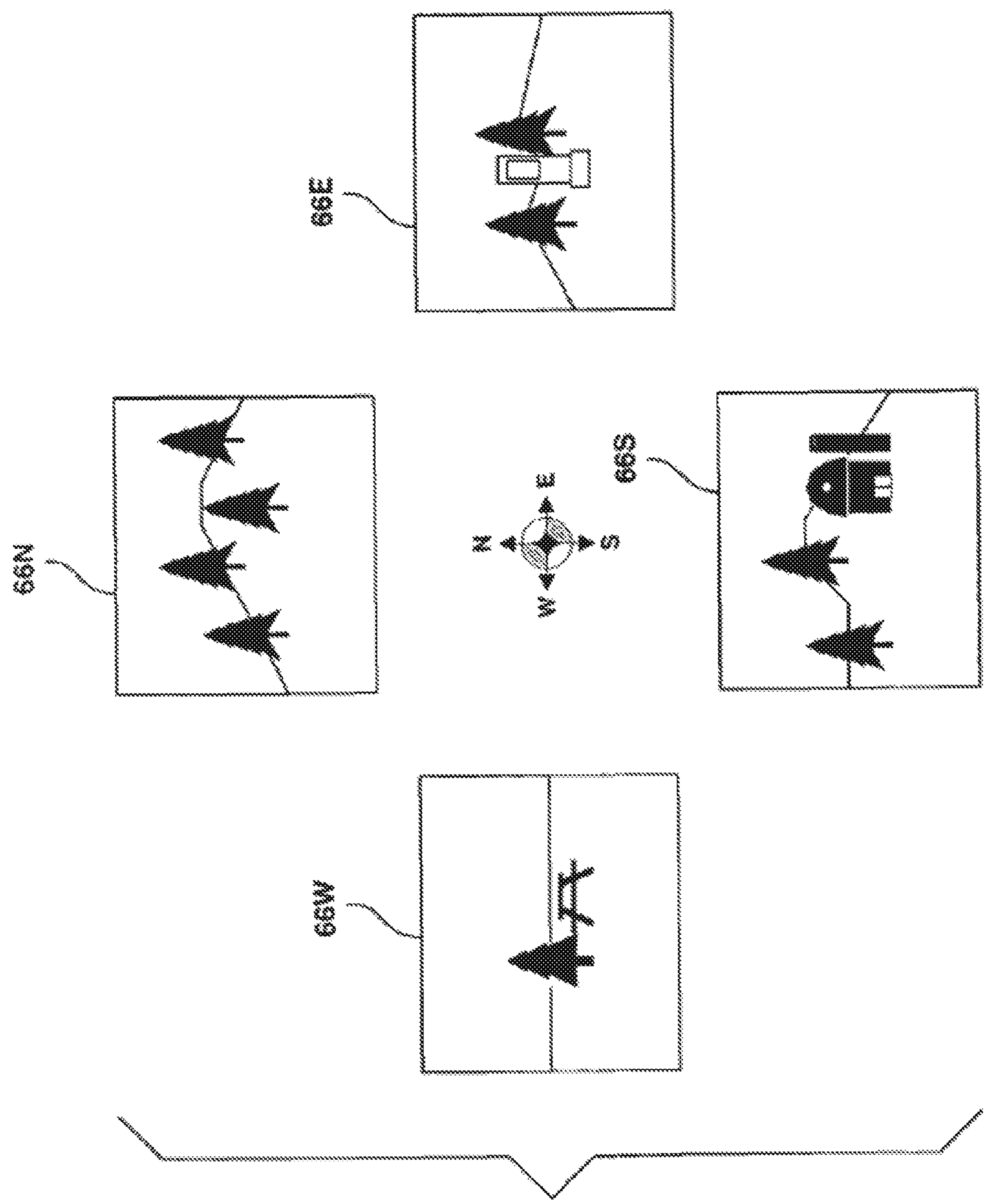
FIG. 11 represents photographs that define a simplified virtual reality representation of a physical location modeled in the virtual universe.

FIG. 11 illustrates a preferred, simplified virtual reality format. Four images 66 are taken with a digital camera from a point, each photograph having a line of view facing north, south, east, and west, respectively. The administrative program uploads the four image files and presents an on-line form requesting the location of the point and associated metadata. The administrative program stores the image files as VR data 24 on a VR data server 20, updates the universe database 30, adds the appropriate VRR record to the network database 32, and adds the appropriate VR record to the local database 36. Because the illustrated public region 62 represents an area of the Earth, the latitude and longitude of the corresponding physical location of an actual point on the Earth's surface provides a convenient way of identifying the location of a point 18 on the map 12. The administrative program requests the latitude and longitude of the point, which can be obtained, for example, by a GPS reading when the digital photographs are taken.

It is understood that other kinds of metadata, data fields, data keys, or data formats can be used for or stored in the databases 30, 32, and 36 and that other VR data 24 can be stored in other file formats. The data can be distributed on other servers on the network 10. But the VR browser 14 preferably accesses the network 10 initially through the single domain server 26 regardless of how the data itself is distributed throughout the network 10.

It is contemplated that embodiments of the virtual reality network 10 will be customized for particular industries or visitors. For example, a real estate network would host virtual reality representations of houses available for sale. The seller's real estate agent takes photographs of each room in a house and uploads them to the real estate network, along with the floor plan and other metadata. A buyer's real estate agent selects the house to visit, and the VR browser displays the floor plan and the paths through the house. The visitor moves along the paths in the house, in effect taking a virtual reality tour through each room in the house.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

While we have illustrated and described preferred embodiments of our invention, it is understood that this is capable of modification, and we therefore do not wish to be limited to the precise details set forth, but desire to avail ourselves of such changes and alterations as fall within the purview of the following claims.

What is claimed is:

1. A device for displaying a digital representation of a location, the device comprising:

memory that stores a map of a plurality of different real world locations each associated with at least one digital representation;

a processor that executes instructions stored in memory, wherein execution of the instructions by the processor:

detects user input indicative of movement to one of the locations, and identifies that the indicated location is associated with a plurality of available digital representations, each available digital representation associated with a different set of display quality metrics;

a network interface that communicates over a communication network to retrieve a data set associated with an identified one of the available digital representations from a remote data server, wherein the identified digital representation is associated with the set of display quality metrics corresponding to a current set of device capabilities; and a headset display that displays the identified digital representation of the indicated location based on the retrieved data set.

2. The device of claim 1, wherein the current set of device capabilities also includes one or more metrics that measure data speed.

3. The device of claim 1, wherein each of the available digital representations is further associated with a type, and wherein the type is displayed in association with a respective one of the locations on the map.

4. The device of claim 1, wherein each real-world location on the map is associated with a number of different digital representations, and wherein the number is displayed in association with a respective one of the locations on the map.

5. The device of claim 1, wherein the headset display further displays the map of the plurality of different real world locations.

6. The device of claim 5, wherein the headset display displays the map in a separate window from the identified digital representation of the indicated location.

7. The device of claim 1, wherein the processor identifies the current set of device capabilities of the headset display that displays the digital representation of the indicated location; and wherein the network interface retrieves the data set for the indicated location based on the current set of device capabilities of the headset display.

8. The device of claim 1, wherein the detected user input is further indicative of a selected display quality level that is lower than a maximum display quality level associated with the current set of device capabilities; and wherein the network interface retrieves the data set further based on the selected display quality level.

9. The device of claim 8, wherein the selected display quality level is different than a selected display quality level for a different location on the map.

10. A method for displaying a digital representation of a location, the method comprising:

storing into memory a map of a plurality of different real world locations each associated with at least one digital representation;

detecting, via a processor, user input indicative of movement to one of the locations;

identifying, via the processor, that the indicated location is associated with a plurality of available digital representations, each available digital representation associated with a different set of display quality metrics;

communicating, via a network interface, over a communication network to retrieve a data set associated with an identified one of the available digital representations from a remote data server, wherein the identified digital representation is associated with the set of display quality metrics corresponding to a current set of device capabilities; and displaying, via a headset, the identified digital representation of the indicated location based on the retrieved data set.

11. The method of claim 10, wherein the current set of device capabilities also includes one or more metrics that measure data speed.

12. The method of claim 10, wherein each of the available digital representations is further associated with a type, and wherein the type is displayed in association with a respective one of the locations on the map.

13. The method of claim 10 wherein each real-world location on the map is associated with a number of different digital representations, and wherein the number is displayed in association with a respective one of the locations on the map.

14. The method of claim 10, wherein the headset further displays the map of the plurality of different real world locations.

15. The method of claim 14, wherein the headset displays the map in a separate window from the identified digital representation of the indicated location.

16. The method of claim 10 further comprising:

identifying, via the processor, the current set of device capabilities of the headset that displays the digital representation of the indicated location; and retrieving, via the network interface the data set for the indicated location based on the current set of device capabilities of the headset.

17. The method of claim 10, wherein the detected user input is further indicative of a selected display quality level that is lower than a maximum display quality level associated with the current set of device capabilities; and wherein the network interface retrieves the data set further based on the selected display quality level.

18. The method of claim 17, wherein the selected display quality level is different than a selected display quality level for a different location on the map.

19. A non-transitory computer-readable storage medium having embodied thereon a program executable by a processor to perform a method for displaying a digital representation of a location, the method comprising:

storing into memory a map of a plurality of different real world locations each associated with at least one digital representation;

detecting user input indicative of movement to one of the locations;

identifying that the indicated location is associated with a plurality of available digital representations, each available digital representation associated with a different set of display quality metrics;

communicating, via a network interface, over a communication network to retrieve a data set associated with an identified one of the available digital representations from a remote data server, wherein the identified digital representation is associated with the set of display quality metrics corresponding to a current set of device capabilities; and displaying, via a headset, the identified digital representation of the indicated location based on the retrieved data set.

* * * * *